(12) United States Patent
Codato et al.

(10) Patent No.: US 12,308,693 B2
(45) Date of Patent: May 20, 2025

(54) POWER SUPPLY HAVING LOW STANDBY POWER CONSUMPTION

(71) Applicant: Datalogic IP Tech S.r.l., Lippo di Calderara di Reno (IT)

(72) Inventors: Sandro Codato, Mestre (IT); Paolo Mazzocato, Casier (IT); Franco Favaro, Venice (IT)

(73) Assignee: Datalogic IP Tech S.r.l., Bologna (IT)

( * ) Notice: Subject to any disclaimer, the term of this patent is extended or adjusted under 35 U.S.C. 154(b) by 107 days.

(21) Appl. No.: 18/157,481

(22) Filed: Jan. 20, 2023

(65) Prior Publication Data

US 2024/0250554 A1 Jul. 25, 2024

(51) Int. Cl.
*H02J 9/00* (2006.01)
*G06F 1/3206* (2019.01)
(Continued)

(52) U.S. Cl.
CPC ............ *H02J 9/007* (2020.01); *G06F 1/3206* (2013.01); *G06F 1/324* (2013.01); *H02J 7/04* (2013.01); *H02J 7/35* (2013.01); *H02M 1/0032* (2021.05); *H02M 3/33523* (2013.01); *H02M 7/06* (2013.01); *H02J 2207/20* (2020.01); *H02M 7/05* (2021.05)

(58) Field of Classification Search
CPC . G06F 1/25; G06F 1/28; G06F 1/3206; G06F 1/3215; G06F 1/324; G06F 1/26; H02J 7/04; H02J 7/35; H02J 9/007; H02J 2207/20; H02J 7/0031; H02J 7/0047; H02J 7/0063; H02M 7/06; H02M 1/0032; H02M 1/0006; H02M 3/33523; H02M 7/05
See application file for complete search history.

(56) References Cited

U.S. PATENT DOCUMENTS 5,943,418 A * 8/1999 Walker ................ H04M 19/026
379/382
8,232,685 B2 7/2012 Perper et al.
(Continued)

FOREIGN PATENT DOCUMENTS

WO 2021/181094 A1 9/2021

OTHER PUBLICATIONS

European Search Report received for European Application No. 24151554.3, mailed on Jun. 17, 2024, 9 pages.
(Continued)

*Primary Examiner* — Thomas J. Cleary
(74) *Attorney, Agent, or Firm* — Shook, Hardy & Bacon L.L.P.

(57) ABSTRACT

The technology described herein relates to methods and systems for reducing standby power consumed by electronic devices. A control unit is powered by a control unit power source. The control unit power source, in some embodiments, comprises a first photovoltaic driver and a second photovoltaic driver mounted in an anti-parallel configuration. In other embodiments, the control unit power source is a battery (e.g., a rechargeable battery). In addition, the control unit can cause a load power source to switch off upon detection of an absence of a load (e.g., by using the load detector) without the use of a shunt resistor. The control unit also causes the load power source to discharge electricity to the load upon detection of the load.

20 Claims, 9 Drawing Sheets

(51) Int. Cl.
   *G06F 1/324* (2019.01)
   *H02J 7/04* (2006.01)
   *H02J 7/35* (2006.01)
   *H02M 1/00* (2007.01)
   *H02M 3/335* (2006.01)
   *H02M 7/06* (2006.01)
   *H02M 7/04* (2006.01)

(56) References Cited

U.S. PATENT DOCUMENTS

| | | | |
|---|---|---|---|
| 9,337,714 B2* | 5/2016 | Malinin | H02M 1/08 |
| 9,559,596 B2 | 1/2017 | Atrash et al. | |
| 9,805,890 B2 | 10/2017 | Doljack | |
| 9,912,243 B2* | 3/2018 | Quigley | H02M 3/33515 |
| 10,199,921 B2* | 2/2019 | Chung | H02M 1/15 |
| 10,910,954 B1* | 2/2021 | Shah | H01R 24/60 |
| 10,985,663 B2* | 4/2021 | Chung | H02M 3/33523 |
| 2002/0190579 A1* | 12/2002 | Odaohhara | G06F 1/26 |
| | | | 307/126 |
| 2003/0107322 A1* | 6/2003 | Melvin | H03K 17/785 |
| | | | 315/77 |
| 2009/0295226 A1 | 12/2009 | Hodges et al. | |
| 2010/0202161 A1* | 8/2010 | Sims | H02M 7/02 |
| | | | 363/20 |
| 2012/0139477 A1* | 6/2012 | Oglesbee | H02J 9/005 |
| | | | 307/130 |
| 2014/0016359 A1* | 1/2014 | Telefus | H02M 1/36 |
| | | | 363/16 |
| 2015/0089261 A1* | 3/2015 | Segawa | G06F 1/324 |
| | | | 713/323 |
| 2015/0171758 A1* | 6/2015 | Atrash | H02M 3/33507 |
| | | | 363/21.15 |
| 2015/0311806 A1* | 10/2015 | Kim | H02M 3/33507 |
| | | | 363/21.17 |
| 2017/0207694 A1* | 7/2017 | Strijker | H02M 3/073 |
| 2017/0279369 A1* | 9/2017 | Meng | H02M 7/06 |
| 2020/0287454 A1 | 9/2020 | Lee et al. | |
| 2022/0239216 A1* | 7/2022 | Jang | H02M 1/0035 |
| 2022/0239291 A1* | 7/2022 | Feil | H03K 17/689 |
| 2023/0179436 A1* | 6/2023 | Peng | H04L 12/10 |
| | | | 713/320 |
| 2024/0154054 A1* | 5/2024 | Wang | H01L 31/02325 |

OTHER PUBLICATIONS

Energy.gov, https://www.energy.gov/, Accessed May 18, 2023 (5 pages).
Nuemuller Elektronik GmbH, https://www.neumueller.com/en/knowledge/normen-richtlinien/neuregelunglevelvi, Accessed May 18, 2023 (5 pages).
SL Power, https://slpower.com/app-notes-white-papers, Accessed May 8, 2023 (11 pages).
Panasonic Industry, https://www3.panasonic.biz/ac/e/control/relay/photomos/apv/apv_hp/index.jsp, Accessed May 8, 2023 (2 pages).
Microchip, https://www.microchip.com/en-us/solutions/low-power/8-bit-low-power-mcus, Accessed May 8, 2023 (13 pages).

* cited by examiner

POWER SUPPLY HAVING LOW STANDBY POWER CONSUMPTION

BACKGROUND

Electronic devices (e.g., laptops, televisions, home appliances, mobile devices, barcode readers, vision camera systems, internet of things devices, electric vehicles, electric vehicle appliances, other types of electronic devices, or one or more combinations thereof) can be powered by power supplies or battery chargers. Standby power, the electric power consumed by electronic devices that are off or in standby mode, has been estimated to account for up to 40% of an electronic device total energy usage. Worldwide electricity consumption has continuously grown over the past half a century (approximately 23,900 terawatt-hours in 2019), and standby energy accounts for about 10% of this consumption. Residential homes, commercial buildings, warehouses, and factories, for example, consume standby power that can result in global carbon emissions, decreased efficiencies in devices, and reductions in electronic device longevity. As such, reducing standby power would be useful and advantageous.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the technology disclosed herein provide for the reduction of standby power that is consumed by electronic devices. For example, a control unit receives power from a control unit power source, which is a separate power source than a load power source for powering a detected load corresponding to an electronic device. The control unit may have one or more of the following: one or more processors (e.g., one or more microprocessors), computer storage memory, one or more low-frequency oscillators, one or more high-frequency oscillators, one or more general-purpose input/outputs (I/O), one or more analog to digital converters, another type of control unit component, or one or more combinations thereof. The control unit can cause a discharge of electricity from the load power source to the load upon detection, by using a load detector (to receive load detector data, for example), of the load. The load can be detected without the use of a shunt resistor. The control unit can also switch off the load power source (e.g., by controlling a switch, such as a metal-oxide-semiconductor field effect transistor (MOSFET)) upon detection of an absence of the load. In some embodiments, the load detector is separate from the control unit.

In some embodiments, the control unit power source includes one or more rechargeable batteries (e.g., one or more capacitors, one or more batteries, or one or more combinations thereof). In other embodiments, the control unit power source comprises a first photovoltaic driver (e.g., a photovoltaic MOSFET driver) and a second photovoltaic driver mounted in an anti-parallel configuration, and rectifier components connected to at least one of the photovoltaic drivers to generate power for the control unit. For example, the power generated for the control unit is based on the coupling of light emitting components (e.g., light emitting diodes (LEDs)) and photodetectors encapsulated in a photo driver package. In some embodiments, the photovoltaic drivers of the control unit power source are connected with components (e.g., resistors, capacitors, or semiconductors) capable of affecting the current flow.

The load power source, when caused by the control unit to discharge electricity to the load upon the detection of the load, feeds the load by supplying a direct current voltage to generate output, which is galvanically isolated from the input. In embodiments, the load power source is caused to discharge electricity or is deactivated via a photocoupler having an LED as an input and MOSFET as an output. For example, the load power source can be deactivated by the semiconductor device upon detection of the absence of the load. The semiconductor device can be located on the feed line. The load detector, control unit, or one or more combinations thereof, can detect the presence or absence of the load based on measuring a voltage across one or more capacitors associated with the load power source and the load detector.

BRIEF DESCRIPTION OF THE DRAWINGS

The present disclosure is illustrated by way of example and not limitation in the accompanying figures in which like reference numerals indicate similar elements and in which.

DETAILED DESCRIPTION

Figure 1:
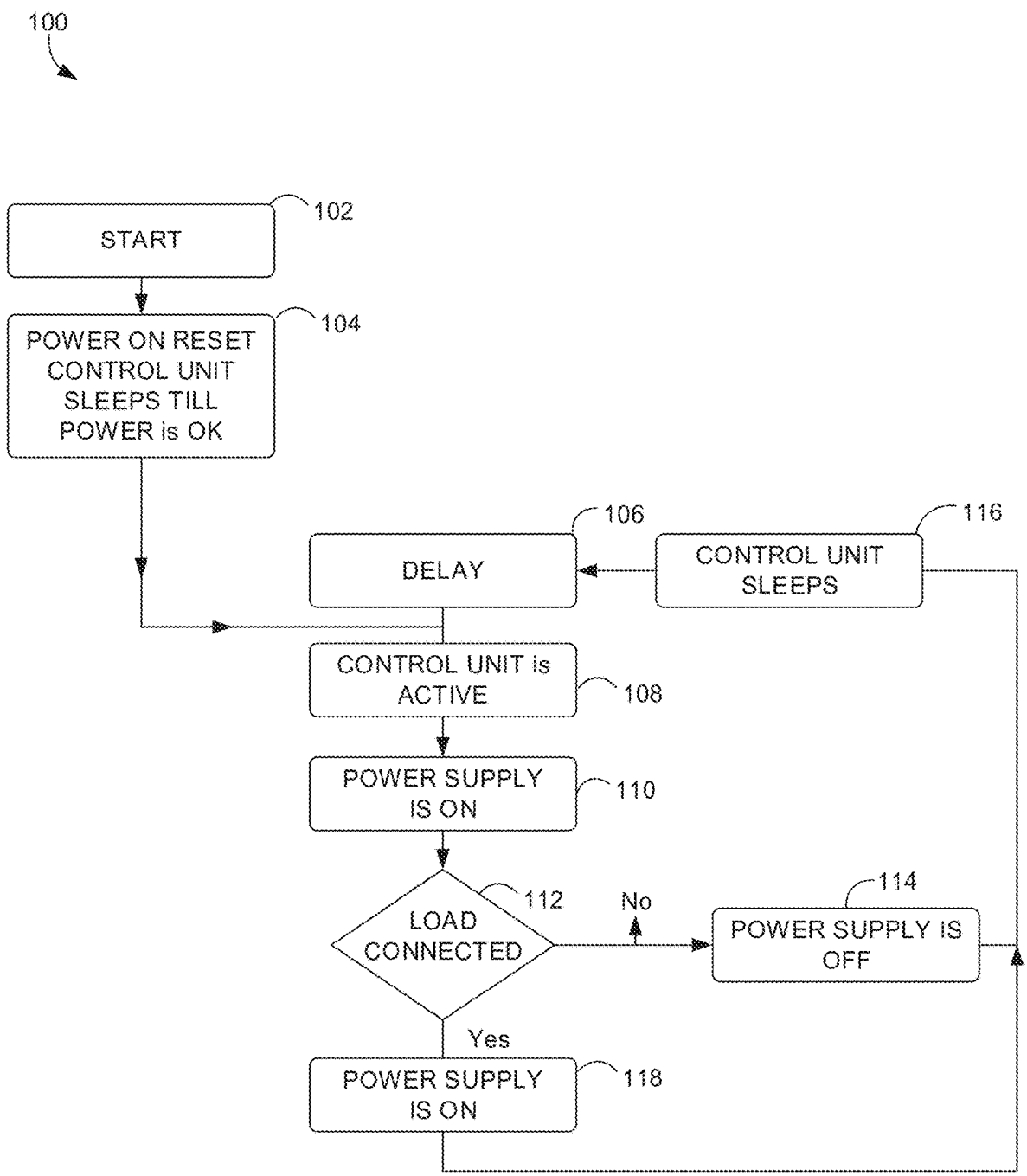
FIG. 1 a schematic diagram of an example process for reducing standby power that is consumed by electronic devices, in accordance with an embodiment of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the technology described herein may be embodied as, among other things, a method, system, an apparatus, or computer-program product. Accordingly, the embodiments may take the form of a hardware embodiment, or an embodiment combining software and hardware. An embodiment that takes the form of a computer-program product can include computer-useable instructions embodied on one or more computer-readable media (see, e.g., FIG. 9).

In addition, words such as "a" and "an," unless otherwise indicated to the contrary, may also include the plural as well as the singular. Thus, for example, the constraint of "a feature" is satisfied where one or more features are present.

Further, the term "or" includes the conjunctive, the disjunctive, and both (a or b thus includes either a or b, as well as a and b).

Furthermore, the term "some" may refer to "one or more."

Additionally, an element in the singular may refer to "one or more."

Unless specifically stated otherwise, descriptors such as "first," "second," and "third," for example, are used herein without imputing or otherwise indicating any meaning of priority, physical order, arrangement in a list, or ordering in any way, but are merely used as labels to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

By way of background, prior methods and systems sometimes include a power supply and a lower-power power supply, but the lower-power power supply is not always operating at a lower power or not always providing a lower power than the other power supply. For example, both of these power supplies of the prior methods and systems are connected to the load via a diode or a similar component, and both of these power supplies deliver the same voltage. In addition, these prior systems and methods use shunt resistors to detect output current and a load. Shunt resistors within these systems fail to detect small voltage yields from low currents (e.g., 0.1 A on 10 mΩ yielding 1 mV). In addition to the low voltage produced by light loads, placing a shunt resistor on the positive side of the output voltage results in the detector having a very high-voltage common-mode, which is difficult to cancel and thus fails to detect small voltage yields from low currents.

Further, in these prior methods and systems, when the load absorption exceeds the capacity of the lower-power power supply, the other power supply is either not activated or activated too late, which results in the system failing altogether. Other types of prior methods and systems use a single power supply for the load and any additional control modules.

The technology disclosed herein can cure at least these deficiencies in these prior methods and systems. For example, the technology disclosed herein provides improved methods, systems, and components for reducing standby power that is consumed by electronic devices. For example, unlike the lower-power power supply of the prior methods and systems that is not always operating at a lower power or not always providing a lower power than the other power supply, the technology disclosed herein remedies this problem via the control unit power source, which is a separate power source than the load power source that supplies power to the detected load that corresponds to one or more electronic devices.

As another example, the technology disclosed herein remedies the load detection problem of the prior methods and systems by detecting the absence or presence of a load without use of a shunt resistor. For example, the disclosed load detector, control unit, or one or more combinations thereof, can measure a voltage across one or more capacitors associated with the load power source and the load detector. Continuing the example, when a switch associated with the load power source (and load detector, in some embodiments) is open, the voltage across at least one capacitor (e.g., associated with the load detector) decreases at a rate dependent upon the load, which is detectable by the load detector, control unit, or one or more combinations thereof, discussed herein. When the load detector control unit, or one or more combinations thereof, indicates that this voltage has remained above a threshold for a predetermined time (e.g., 25 milliseconds), the control unit determines that the load is absent (e.g., the load is disconnected from the system).

One embodiment of the technology disclosed herein includes a control unit for a load power source. The control unit is powered by a control unit power source. The control unit comprises one or more processors and one or more computer storage memory having computer-executable instructions stored thereon that, when executed by the one or more processors, cause the one or more processors to perform operations. For example, the one or more processors cause a discharge of electricity from the load power source to a load upon detection, by using a load detector, of the load. The one or more processors also cause the load power source to switch off upon detection of an absence of the load. Further, the control unit power source comprises a first photovoltaic driver and a second photovoltaic driver mounted in an anti-parallel configuration. The first photovoltaic driver and the second photovoltaic driver each comprise a light emitting component for receiving a current input and a photodetector associated with generating a current output. The control unit power source also comprises a plurality of rectifier components connected to at least one of the first photovoltaic driver and the second photovoltaic driver for receiving the current output to generate power for the control unit.

Another embodiment includes a method for reducing standby power consumption. The method comprises receiving power, from a control unit power source, at a control unit. The method also includes receiving load detection data. Based on the load detection data, the method determines whether a load is present or absent without using a resistor. As such, the control unit causes a load power source to discharge electricity to the load upon determining the load is present. Furthermore, the control unit causes the load power source to switch off upon determining the load is absent.

Another embodiment includes a system comprising a load power source, a switch, a load detector, a control unit, and a control unit power source that powers the control unit. The control unit has at least one microprocessor and computer storage memory, wherein the computer storage memory has computer-executable instructions stored thereon that, when executed by the at least one microprocessor, cause the at least one microprocessor to control the switch and thus switch off the load power source upon detection, by using the load detector and without using a resistor, of an absence of the load.

Referring now to the drawings generally and, more specifically, referring to FIG. 1, example process 100 is provided for reducing standby power that is consumed by electronic devices. Example process 100 is an example embodiment of the technology disclosed herein. Certain blocks in block-diagram form are shown more for being able to reference something consistent with the nature of a patent than to imply that a certain step is or is not part of the example process 100. Similarly, although some blocks are depicted in the singular form, plural items are contemplated as well (e.g., what is shown as one step might really be multiple steps); but showing every variation of each item might obscure the embodiments illustrated. Thus, for readability, items are shown and referenced in the singular (while fully contemplating, where applicable, the plural).

As shown in FIG. 1, example process 100 starts 102 upon powering or resetting the control unit at 104. For example, the control unit is powered by the control unit power source. Upon receiving power from the control unit power source, the control unit can begin operating using a low-frequency oscillator (e.g., 32 kHz, 39 kHz) of the control unit to achieve a minimum power consumption. In addition, the output current generated by the control unit power source charges a capacitor corresponding to the control unit power source, which can be used by the control unit at a later time. The capacitor corresponding to the control unit power source has a low leakage current (e.g., a ceramic capacitor, a foil capacitor, a plastic film capacitor) and a high capacitance (e.g., 100 Microfarad of capacity).

Continuing the example, the control unit has at least one microprocessor and computer storage memory. The computer storage memory has computer-executable instructions stored thereon that, when executed by the at least one microprocessor, cause the at least one microprocessor to activate the low-frequency oscillator upon receiving power from the control unit power source. The at least one microprocessor can also control a switch that is used to activate and deactivate a load power source, which is separate and different power source than the circuit unit power source. The switch may be a metal-oxide-semiconductor field effect transistor (MOSFET). For example, the switch may be a semiconductor device having an LED as an input and a MOSFET as an output. The switch can be located on the feed line.

As soon as the voltage provided by the control unit power supply is valid at 108, the control unit activates the load power source, and can then receive power from the load power source at 110. The load power source can supply a direct current voltage at one or more terminals of a capacitor to generate an output, which is galvanically isolated from the input. Activation of the load power source does not cause the other capacitor corresponding to the control unit power source to discharge any stored power received by the control unit power source.

Once the load power source is on at 110, the load power source provides power to the control unit, such that the control unit can operate using a high-frequency oscillator (e.g., a voltage controlled oscillator, a semiconductor oscillator, a microelectromechanical system oscillator) of the control unit. In addition, upon receiving the power from the load power source, the at least one microprocessor causes operation of one or more peripherals of the control unit that are associated with the high-frequency oscillator. For example, the peripherals can include an analog/digital (A/D) converter, a Phased Locked Loop, a column driver, a row driver, other types of peripherals, or one or more combinations thereof.

At 112, a load detector is used to determine whether the load is present or absent, and this determination is made without using a resistor, such as a shunt resistor for example. In some embodiments, the load detector is separate from the control unit and comprises one or more capacitors and a switch that is used to control electricity discharged from the load power source. The load detector measures a voltage across the one or more capacitors of the load detector. The rate of the voltage across the one or more capacitors depends upon the load. When the load detector indicates that the measured voltage has not remained above a threshold for a predetermined time (e.g., 25 milliseconds) or that the measured voltage is below the threshold, the control unit determines that the load is present (e.g., the load is still connected to the system). As such, the switch corresponding to the load detector is closed, the load power source remains activated, and the load power source supplies power to the load at 118.

In addition, at 112, the load detector can be used to determine that the load is absent. For example, the load detector can indicate that the measured voltage of the one or more capacitors has remained above a threshold for a predetermined time (e.g., 24 milliseconds) or that the measured voltage is above the threshold, the control unit can then determine that the load is absent (e.g., the load is disconnected from the system). As such, the control unit causes the switch corresponding to the load detector to remain open and also causes the load power source to deactivate at 114. At 116, the control unit enters a sleep mode to reduce the power consumption, and a timer corresponding to the control unit is set for a predetermined time (e.g., 10-30 seconds) for the delay at 106 of the subsequent action of the load detector measuring load detection data for determining whether the load is present or absent. During the time between two load-detections, the control unit sleeps to achieve a very low power consumption.

Figure 2:
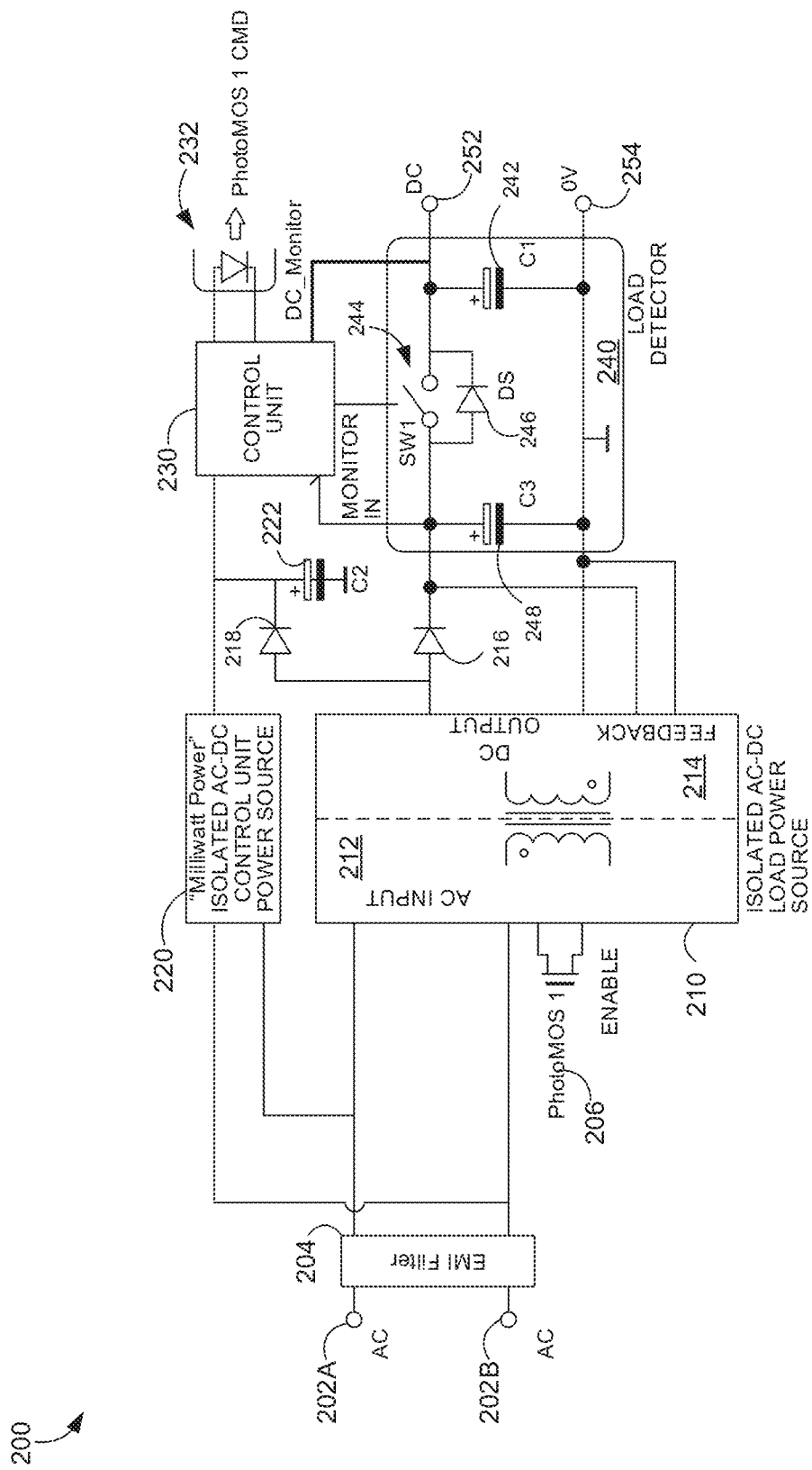
FIG. 2 depicts example operational logic for a load power source, a control unit, a control unit power source, and a load detector, in accordance with an embodiment of the present disclosure.
Figure 9:
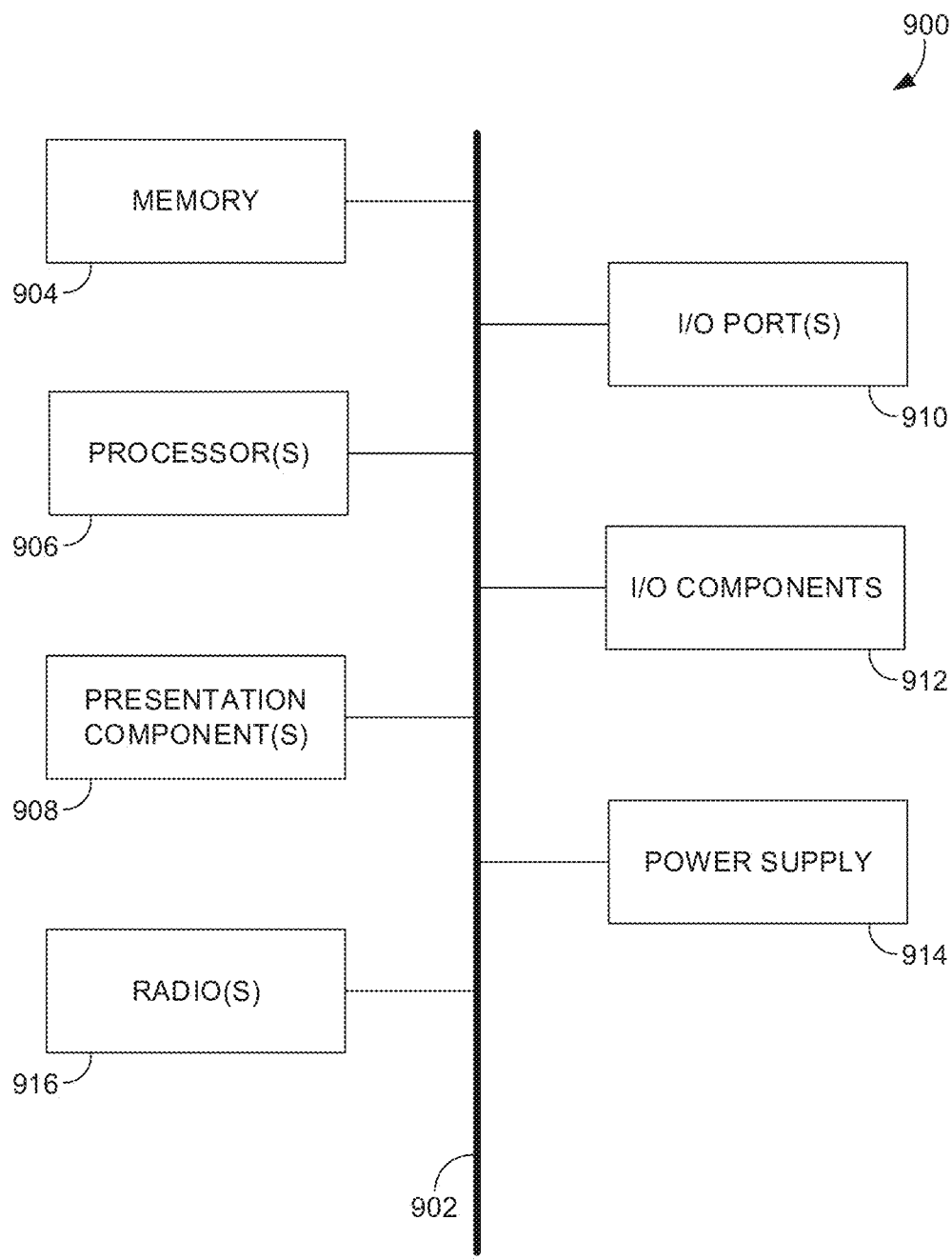
FIG. 9 is a block diagram of an example computing device suitable for use in implementing aspects of the technology described herein.

Referring now to FIG. 2, an example operational environment 200 is provided for reducing standby power that is consumed by electronic devices (e.g., computing device 900 of FIG. 9). Example operational environment 200 is provided as an example embodiment of the technology disclosed herein. Certain components are shown to reference something consistent with the nature of a patent and do not imply that a certain component is, or is not, part of a certain device. Similarly, although some items are depicted in the singular form, plural items are contemplated as well (e.g., what is shown as one capacitor might really be multiple capacitors having one or more configurations); but showing every variation of each item might obscure the embodiments illustrated. Thus, for readability, items are shown and referenced in the singular (while fully contemplating, where applicable, the plural).

Example operational environment 200 comprises load power source 210, control unit power source 220, control unit 230, and load detector 240. In example operational environment 200, an electromagnetic interference (EMI) filter 204 is connected between alternating current (AC) power input terminals 202A and 202B, such that the load power source 210 and the control unit power source 220 can convert the AC power to direct current (DC) power. The control unit 230 can cause the load power source 210 to activate or deactivate via semiconductor device 206 that can be located on the feed line. Semiconductor device 206 may have a light emitting diode (LED) as an input and MOSFET as an output, with electrical insulation between the input and output. For example, the semiconductor device 206 can be a PhotoMOS. In other embodiments, the semiconductor device 206 is a device that operates by converting incoming photons to electrons in the base of a bipolar transistor, such as a phototransistor for example. In other embodiments, the semiconductor device 206 is a Darlington transistor having two bipolar transistors with the emitter of one transistor connected to the base of the other transistor.

AC input 212 of the load power source 210 is used to generate DC output 214, wherein the AC input 212 is galvanically isolated from the DC output 214. The DC output 214 supplies DC voltage to terminals of capacitor (C3) 248 of the load detector 240. For example, the DC output 214 supplies the DC voltage to terminals of capacitor (C3) 248 based on the DC output 214 connecting with anode terminals of diode 216. Further, the cathode terminal of diode 216 is connected to a positive terminal of capacitor (C3) 248 of the load detector 240.

In some embodiments, the DC output 214 can also supply DC voltage to control unit 230 based on the DC output 214 connection with anode terminals of diode 218. As illustrated in example operational environment 200, the cathode terminal of the diode 218 is connected to a positive terminal of capacitor (C2) 222. Additionally, DC voltage generated by the control unit power source 220 is supplied to capacitor (C2) 222.

In one embodiment, the control unit power source 220 dissipates 15 mW. The AC input of the control unit power source 220 is galvanically isolated from the DC output generated by the control unit power source 220. In embodiments, the control unit power source 220 comprises one or more rechargeable batteries and does not include a transformer (see, e.g., FIG. 6). In embodiments, the control unit power source 220 comprises one or more photovoltaic drivers and does not include a transformer.

Control unit 230 may comprise one or more processors (e.g., a microprocessor), one or more computer storage memory, one or more analog to digital converters, one or more low-frequency oscillators, one or more high-frequency oscillators, one or more general purpose input/outputs, other types of control unit components, or one or more combinations thereof. In some embodiments, the control unit 230 comprises an accelerometer, a magnetometer, a gyro sensor, an ambient light sensor, a proximity sensor, an infrared sensor, an ultraviolet sensor, an altimeter, a compass, a grip sensor, a near field communication device, another type of peripheral, or one or more combinations thereof. The control unit 230 is connected to PhotoMOS 232, which can control the power supplied to the control unit 230. In some embodiments, the PhotoMOS 232 has an internal switch for controlling the power supplied to the control unit 230.

The one or more processors of the control unit 230 can cause the switch 244 of the load detector 240 to open or close. The one or more processors can cause the high-frequency oscillator to activate upon detection of the load. The one or more processors of the control unit 230 can also cause the load power source 210 to activate or deactivate via the semiconductor device 206. The control unit 230 can transmit signals to the load detector 240 and receive load detection data from the load detector 240.

Additionally, the one or more processors can cause the high-frequency oscillator and one or more peripherals (e.g., the analog to digital converter) to deactivate upon detection of the absence of the load. In some embodiments, the control unit 230 may enter into a sleep mode or another type of dormant state upon detection of the absence of the load. For example, the control unit 230 may exhibit a nanoampere current consumption wherein the low-frequency oscillator is active and the high-frequency oscillator is inactive. In some embodiments, the control unit 230 may enter the sleep mode based on a predetermined time in response to the detection of the load absence. Detection of whether the load is present, in some embodiments, is based on using one or more of the accelerometer, magnetometer, gyro sensor, ambient light sensor, proximity sensor, infrared sensor, ultraviolet sensor, altimeter, compass, grip sensor, near field communication device, another type of peripheral, or one or more combinations thereof.

Further, control unit 230 can measure the voltage across capacitor (C1) 242 of load detector 240 and determine whether the load is present. In some embodiments, the load presence or absence is determined based on the measured voltage across capacitor (C1) 242 and the measured voltage across capacitor (C3) 248. In some embodiments, the load presence or absence is determined based on one or more of the measured voltage across capacitor (C1) 242, the measured voltage across capacitor (C3) 248, the accelerometer, magnetometer, gyro sensor, ambient light sensor, proximity sensor, infrared sensor, ultraviolet sensor, altimeter, compass, grip sensor, near field communication device, another type of peripheral, or one or more combinations thereof.

Load detector 240 comprises capacitor (C1) 242, switch 244, diode 246, and capacitor (C3) 248. In some embodiments, switch 244 is a MOSFET. The switch 244, in the open position, disconnects the capacitor (C1) 242 and the load from the DC output of the load power source 210. The switch 244, in the closed position, connects the capacitor (C1) 242 and the load to the DC output of the load power source 210. The load detector 240 is connected to the load power source 210 and the control unit 230.

In some embodiments, diode 246 is not mounted, and when the switch 244 is in the open position after being closed, the voltage across capacitor (C1) 242 decreases at a rate dependent upon the load that was present. In some embodiments, diode 246 is mounted and a load can be detected by measuring the voltage drop across the diode 246 when the switch 244 is open. For example, when the load is not connected, the measured voltage drop will be close to zero. In an embodiment wherein the capacitor (C1) 242 is a 100 microfarad capacitor, a voltage output of 5 V+/−5%=5 V+/−250 mV, when the switch 244 is open, can reach the lower threshold of 5 V−250 mV=4.75 V. For example, the output may be associated with different currents absorbed by the load:

Iout=1 A→25 microseconds
Iout=0.1 A→250 microseconds
Iout=0.01 A→2.5 milliseconds
Iout=0.001 A→25 milliseconds If the measured voltage across capacitor (C1) 242 remains above the lower threshold within a predetermined time (e.g., 25 milliseconds), the control unit 230 determines that the load is absent. Upon determining that the load is absent, the switch 244 is opened (or remains open) and the load power source 210 is deactivated. In addition, the high-frequency oscillator of the control unit 230 can be deactivated, as well as one or more peripherals of the control unit 230. Accordingly, the control unit 230 can then enter the sleep mode and be awaked (e.g., for load detection), within a predetermined time.

If the measured voltage across capacitor (C1) 242 is below a predetermined lower threshold within the predetermined time (e.g., 25 milliseconds), the control unit 230 determines that the load is present. Upon determining that the load is present, the switch 244 is closed (or remains closed) and the load power source 210 continues supplying power. In addition, the high-frequency oscillator of the control unit 230 remains active, as well as the one or more peripherals of the control unit 230. In embodiments, the control unit 230 can enter a dormant state for a predetermined time prior to making a subsequent detection of the presence or absence of the load.

By powering the control unit with the control unit power source and by performing operations based on determining whether the load is present, as described above for example operational environment 200, standby power consumption is reduced. For example, by determining whether the load is present based on the measured voltages associated with the capacitor (C1) 242 (as illustrated in example operational environment 200) and by deactivating the load power source 210 upon determining that the load is absent, global carbon emissions can be decreased, efficiencies in devices corresponding to the load can be increased, battery cell aging of electronic devices corresponding to the load can be decreased, and electronic device longevity can be increased.

Figure 3:
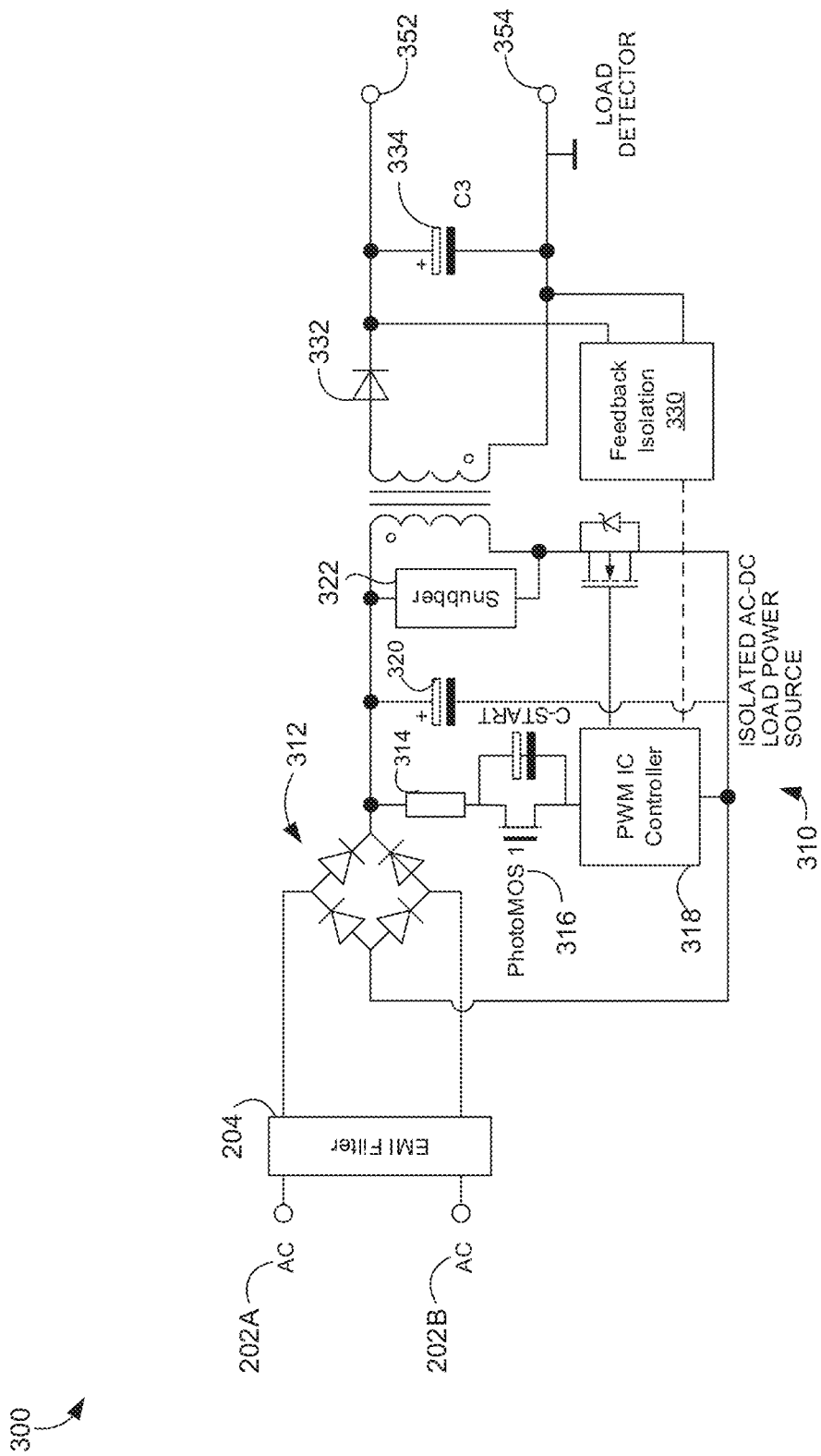
FIG. 3 depicts example operational logic associated with a load power source, in accordance with an embodiment of the present disclosure.

FIG. 3 illustrates example operational logic in example environment 300 associated with a load power source 310. In example environment 300, the EMI filter 204 is connected between AC power input terminals 202A and 202B, such that the load power source 310 can convert the AC power to DC power. Bridge diode 312 of the load power source 310 is a rectifier having an anode terminal and a cathode terminal. The bridge diode 312 receives AC power from the AC power input terminals 202A and 202B based on the EMI filter 204 being connected between the AC power input terminals 202A and 202B.

Two of the four diodes of the bridge diode 312 in example environment 300 have cathodes connected to each other at one connection point and the other two diodes have anodes connected to each other at another connection point associated with pulse width modulator (PWM) integrated circuit (IC) controller 318. The connection point of the two cathodes is connected with resistor 314, positive terminal of capacitor 320, and snubber 322. The snubber 322 can reduce power dissipation by limiting or stopping switching voltage amplitude and the rate of the rise of the voltage amplitude. The PWM IC controller 318 is a fixed frequency control IC that can control power topology, such as fly-back (e.g., as illustrated in FIG. 3), push-pull, boost, forward, buck, other types of power topology, or one or more combinations thereof. Feedback isolation 330, in some embodiments, can be used for determining adjustments to the load power source 310 based on output signals received from the PWM IC controller 318.

PhotoMOS 316 of the load power source 310 can activate or deactivate the load power source 310 based on opening or closing the PhotoMOS 316 located on the feed line. For example, the PhotoMOS 316 can have an input switch for activating or deactivating the load power source 310. PhotoMOS 316 comprises semiconductor material and may include an LED on the input side and a MOSFET on as the output. Further, the PhotoMOS 316 may include a photodiode array that translates light into electrical current and voltage upon the LED receiving input. PhotoMOS 316 can be controlled by one or more processors (e.g., microprocessors) of a control unit (e.g., control unit 230 of FIGS. 2, 6, and 7 or control unit 504 of FIG. 5).

Diode 332 is connected with the positive terminal of capacitor (C3) 334, and the feedback isolation 330 is connected with the terminals of capacitor (C3) 334. The positive terminal of capacitor (C3) 334 is connected to DC input/output terminal 352, and the negative terminal of capacitor (C3) 334 is connected to terminal 354. When using terminal 354 as a reference, voltage output at the DC input/output terminal 352 can be increased or decreased. In embodiments, the capacitor (C3) 334 smooths a voltage output at the DC input/output terminal 352.

Figure 4A:
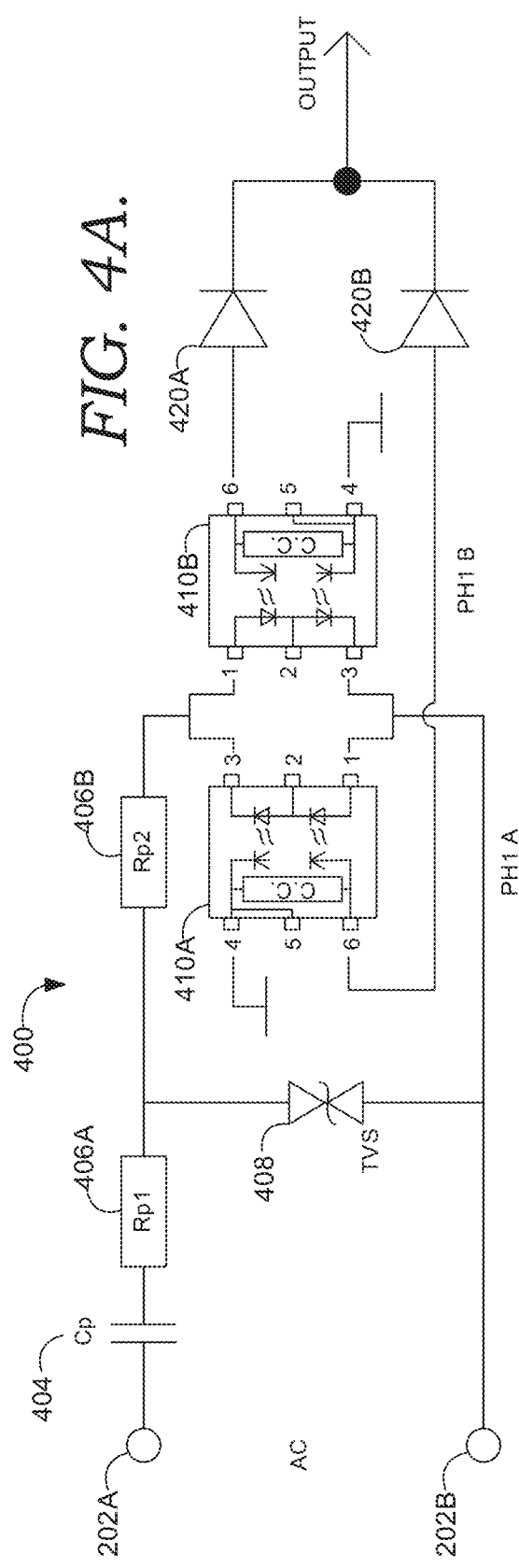
FIGS. 4A and 4B depict example operational logic associated with a control unit power source, in accordance with an embodiment of the present disclosure.
Figure 4B:
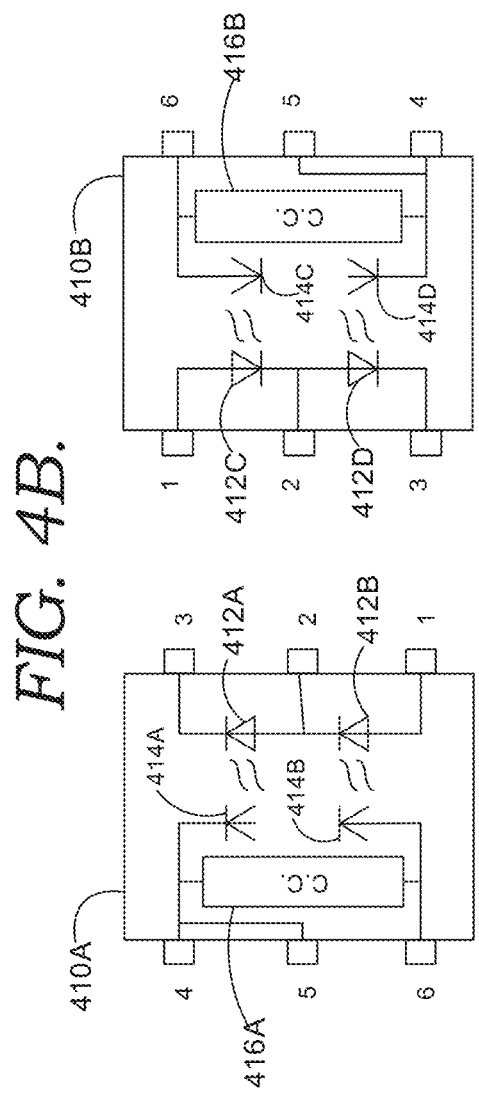

FIGS. 4A and 4B depict example operational logic of a control unit power source 400. The control unit power source 400 receives AC power from AC power input terminals 202A and 202B. AC power terminal 202A is connected to capacitor 404, resistor 406A, and resistor 406B. AC power input terminal 202B is connected to input terminal (1) of photovoltaic driver 410A and input terminal (3) of photovoltaic driver 410B. Photovoltaic driver 410A and photovoltaic driver 410B are mounted in an anti-parallel configuration. Input terminal (3) of photovoltaic driver 410A receives current input based on the connection with the resistor 406B, and input terminal (1) of photovoltaic driver 410B receives current input based on the connection with the resistor 406B. A transient-voltage-suppression (TVS) diode 408 can include a semiconductor substrate and can limit or stop voltage surges. In embodiments, the resistor 406A and resistor 406B are interconnected between the TVS diode 408 for providing the current input to photovoltaic driver 410A and photovoltaic driver 410B. The TVS diode 408 can protect the photovoltaic drivers 410A and 410B.

In some embodiments, the photovoltaic driver 410A and photovoltaic driver 410B are photovoltaic MOSFET drivers that provide galvanic isolation. As illustrated in FIG. 4B, the photovoltaic driver 410A and photovoltaic driver 410B have light emitting components 412A-412D connected with inputs (1), (2), and (3) of each of the photovoltaic driver 410A and photovoltaic driver 410B. In some embodiments, the light emitting components 412A-412D are LEDs. Photodetectors 414A-414D of the photovoltaic driver 410A and photovoltaic driver 410B are connected to the outputs (4), (5), and (6) of each of the photovoltaic driver 410A and photovoltaic driver 410B. As current input flows through the light emitting components 412A-412D, an output current is produced at the outputs (4), (5), and (6) of each of the photovoltaic driver 410A and photovoltaic driver 410B (e.g., 20 microamperes). As one example, if 10 mA is used to excite the light emitting components 412A-412D, a voltage drop on the input of the photovoltaic driver 410A and photovoltaic driver 410B could be 1.5 V, and the dissipated power may be 15 mW. Light emitting components 412A and 412B of photovoltaic driver 410A and light emitting components 412C and 412D of photovoltaic driver 410B can be used to exploit two half-sine waves associated with the AC input current.

For example, returning to FIG. 4A, capacitor 404 provides an AC impedance for the input current received by the photovoltaic drivers 410A and 410B. Continuing the example, for 12 mA to flow through the light emitting components 412A-412D, $Z=V_{in}/I$ (e.g., $V_{in}=220$ V; I=12 mA; and Z=18 k$\Omega$). As such, the capacitor 404=1/(2*$\Pi$*F*Z), wherein F=50 Hz and the capacitor 404=180 nF for this example. As another example, $V_{in}$=115 VAC; F=60 Hz; and I=8 mA. The capacitor 404 does not dissipate active power and does not generate heat. In addition to the capacitor 404, resistor 406A, resistor 406B, and TVS diode 408 can limit the input current to the photovoltaic drivers 410A and 410B. For example, in one embodiment, the TVS diode 408 (e.g., a 10 V model) can limit the input current to 50A (e.g., with resistor 406A=(220 VAC*1.41−10)/Imax; this equaling 300/50=6$\Omega$, which could be raised to 10$\Omega$ to increase a safety margin). In this example, 1 mW on the resistor 406A is wasted. In some embodiments, the resistor 406B can limit the input current to not exceed a maximum input current for the light emitting components 412A-412D. In another example, the light emitting components 412A, 412B, 412C, and 412D can have a peak forward current of 1 A; in this example, if a 10V TVS diode 408 is used, the resistor 406B can be 10Ω, which can be raised to 20Ω to increase the safety margin. In this example, 2 mW on the resistor 406B is wasted.

In addition, the output (6), of the photovoltaic driver 410A of the control unit power source 400, is provided to diode 420B (e.g., one or more rectifier components); and the output (6), of the photovoltaic driver 410B of the control unit power source 400, is provided to diode 420A (e.g., one or more rectifier components). In some embodiments, the diodes 420A and 420B exploit two half-sine waves associated with an AC current input. The current output from the diodes 420A and 420B is galvanically isolated from the AC current input from AC power input terminals 202A and 202B.

In one embodiment, a total output power generated by control unit power source 400 is 18 mW.

Figure 5:
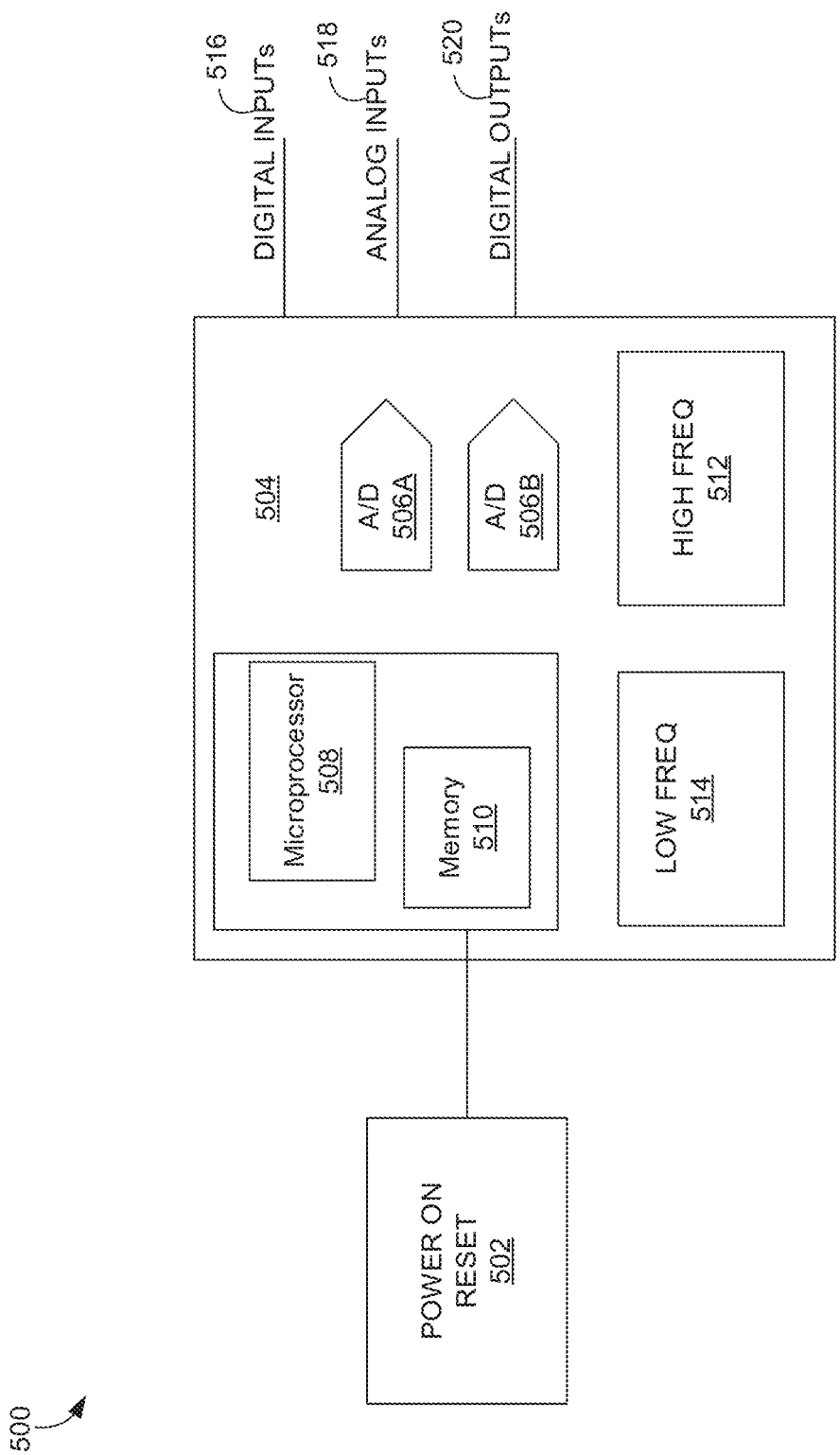
FIG. 5 illustrates an example control unit, in accordance with an embodiment of the present disclosure.

FIG. 5 illustrates example control unit environment 500. Example control unit environment 500 includes an external "power on" or reset component 502; control unit 504 having A/D converters 506A and 506B, one or more microprocessors 508, one or more computer storage memory 510, a high-frequency oscillator 512, and a low-frequency oscillator 514; and digital inputs 516, analog inputs 518, and digital outputs 520. Example control unit environment 500 is but one embodiment of the technology disclosed herein. For example, although some blocks are depicted in the singular form, plural items are contemplated as well. Further, in other embodiments, the control unit 504 may comprise an accelerometer, a magnetometer, a gyro sensor, an ambient light sensor, a proximity sensor, an infrared sensor, an ultraviolet sensor, an altimeter, a compass, a grip sensor, a near field communication device, other types of control unit components, or one or more combinations thereof. In some embodiments, the control unit is control unit 230 of FIG. 2 described above.

Figure 6:
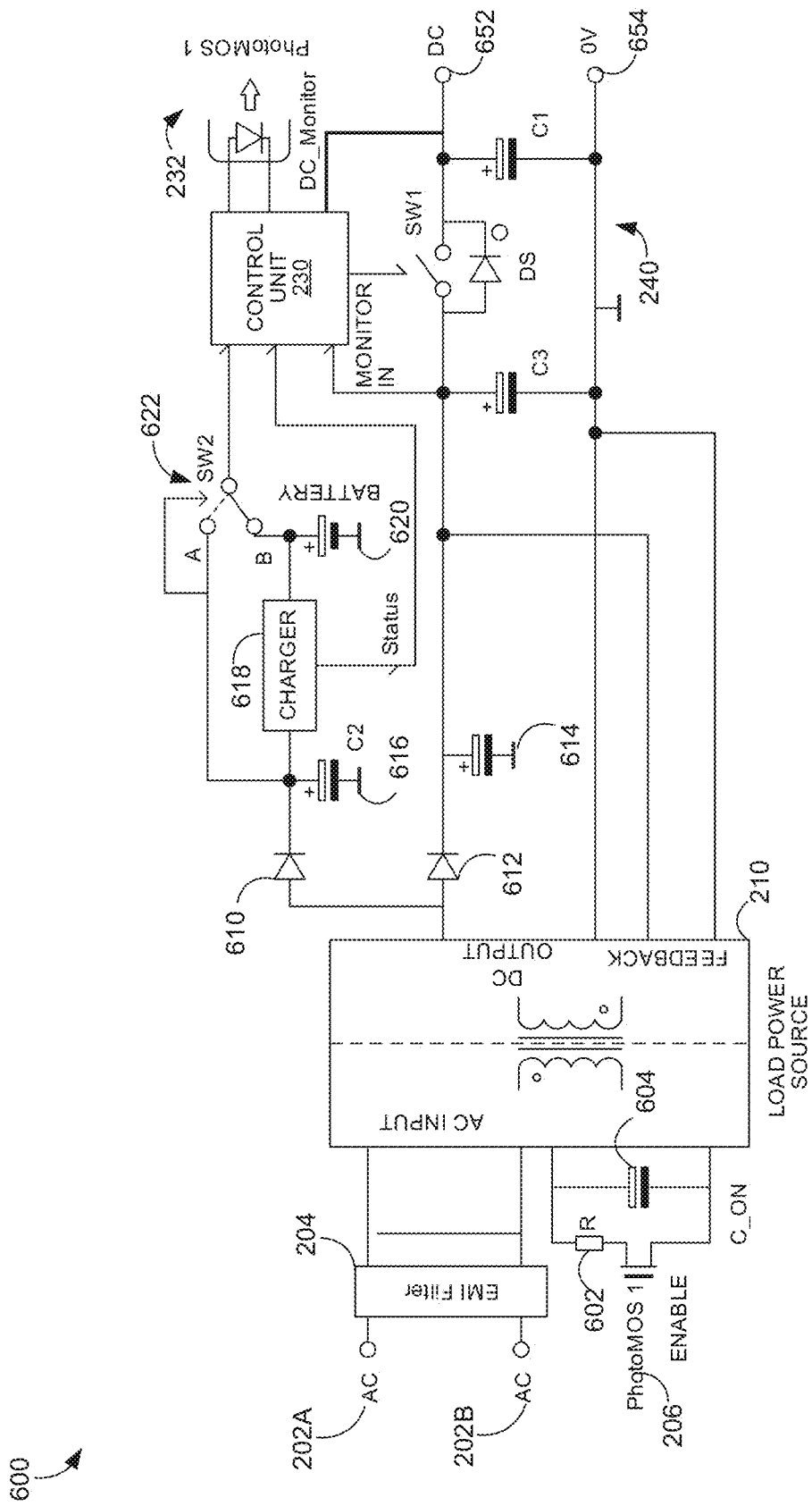
FIG. 6 illustrates another example control unit power source that comprises a battery, in accordance with an embodiment of the present disclosure.

FIG. 6 includes an example operational environment 600 for reducing standby power that is consumed by electronic devices, based at least in part on using a control unit power source comprising a rechargeable battery. In example operational environment 600, the EMI filter 204 is connected between AC power input terminals 202A and 202B, which is connected to the load power source 210 that converts the AC power to DC power. The semiconductor device 206 can be located on the feed line can activate or deactivate the load power source 210. In example operational environment 600, semiconductor device 206 is connected to resistor 602 and capacitor 604, and the resistor 602 is connected to the positive terminal of the capacitor 604.

Diodes 610 and 612 receive the DC power from the load power source 210. Cathode of diode 610 is connected to the positive terminal of capacitor 616, and cathode of diode 612 is connected to the positive terminal of capacitor 614. The positive terminal of capacitor 614 is further connected to the positive terminal of capacitor (C3) of the load detector 240. As illustrated in example operational environment 600, the load detector 240 comprises capacitor (C1), switch (SW1), diode (DS) (which may be mounted in some embodiments or not mounted in other embodiments), and capacitor (C3). In embodiments, the load power source 210 receives feedback from the load detector 240.

The positive terminal of capacitor 616 is connected to charger 618. In some embodiments, the positive terminal of capacitor 616 is connected to the control unit 230 based on the position of the switch 622. For example, switch 622 allows the control unit 230 to be powered by the load power source 210 when the load power source 210 is active. When the load power source 210 is deactivated, the switch 622 allows the control unit 230 to be powered by the rechargeable battery 620. Switch 622 can also be controlled by the control unit 230. The capacitor 604 can enable the load power source 210 upon connection to the main, regardless of the status of the battery 620. In this way, control unit 230 can start to work even when the battery 620 is depleted.

The detection of the load and detection of the absence of the load may be based on a measured voltage across the capacitor (C1), other load detection data received from the load detector 240, other load detection data detected by one or more sensors of the control unit 230, other load detection data, or one or more combinations thereof. As one example, the presence or absence of the load may be determined based on magnetic data detected by a magnetic sensor of the control unit 230. As another example, the presence or absence of the load may be determined based on using a pressure sensor corresponding to an input for the load.

In embodiments, the rechargeable battery 620 can be recharged by the charger 618. The charger 618 is powered by the load power source 210 when the load power source 210 is activated. In addition, the control unit 230 can detect a power level of the charger 618 or a power level of the rechargeable battery 620. Upon the control unit 230 determining that the rechargeable battery 620 has a power level below a threshold, the control unit 230 can cause the load power source 210 to activate or to remain activated. In some embodiments, the control unit 230 determines whether the load is presence, determines the power level of the charger 618, or one or more combinations thereof, within a predetermined time, wherein the predetermined time is based on a power level of the control unit 230.

The control unit 230 can determine the power level of the rechargeable battery 620 based on a current level, a voltage level, a ratio of the available capacity and a maximum possible charge that can be stored in the rechargeable battery 620, a temperature corresponding to the charger 618 or the rechargeable battery 620, a pulse duration of the rechargeable battery 620, a depth of discharge of the rechargeable battery 620, a cut-off voltage associated with a pre-set voltage of the rechargeable battery 620, a temperature of the charger 618 or the rechargeable battery 620 during a particular time interval, another type of charger data or rechargeable battery data, or one or more combinations thereof.

In some embodiments, rechargeable battery 620 can include at least two batteries connected in series or in parallel. In some embodiments, rechargeable battery 620 can have one or more battery cells. In some embodiments, rechargeable battery 620 can be, for example, a Lithium Ion (Li-Ion) battery, a Molten Salt (Na—NiCl2) battery, a Nickel Metal Hydride (Ni-MH) battery, a Lithium Sulphur (Li—S) battery, a Zinc-mercuric oxide battery, a Zinc-silver oxide battery, a Lead-acid battery, another type of battery, or one or more combinations thereof. In some embodiments, the charger 618 may comprise multiple chargers, wherein one or more of the chargers can operate in charging mode, discharging mode, or one or more combinations thereof. The charger 618 may supply charging currents to the rechargeable battery 620 based on charging limit conditions, such as maximum charging times or internal state conditions.

Figure 7:
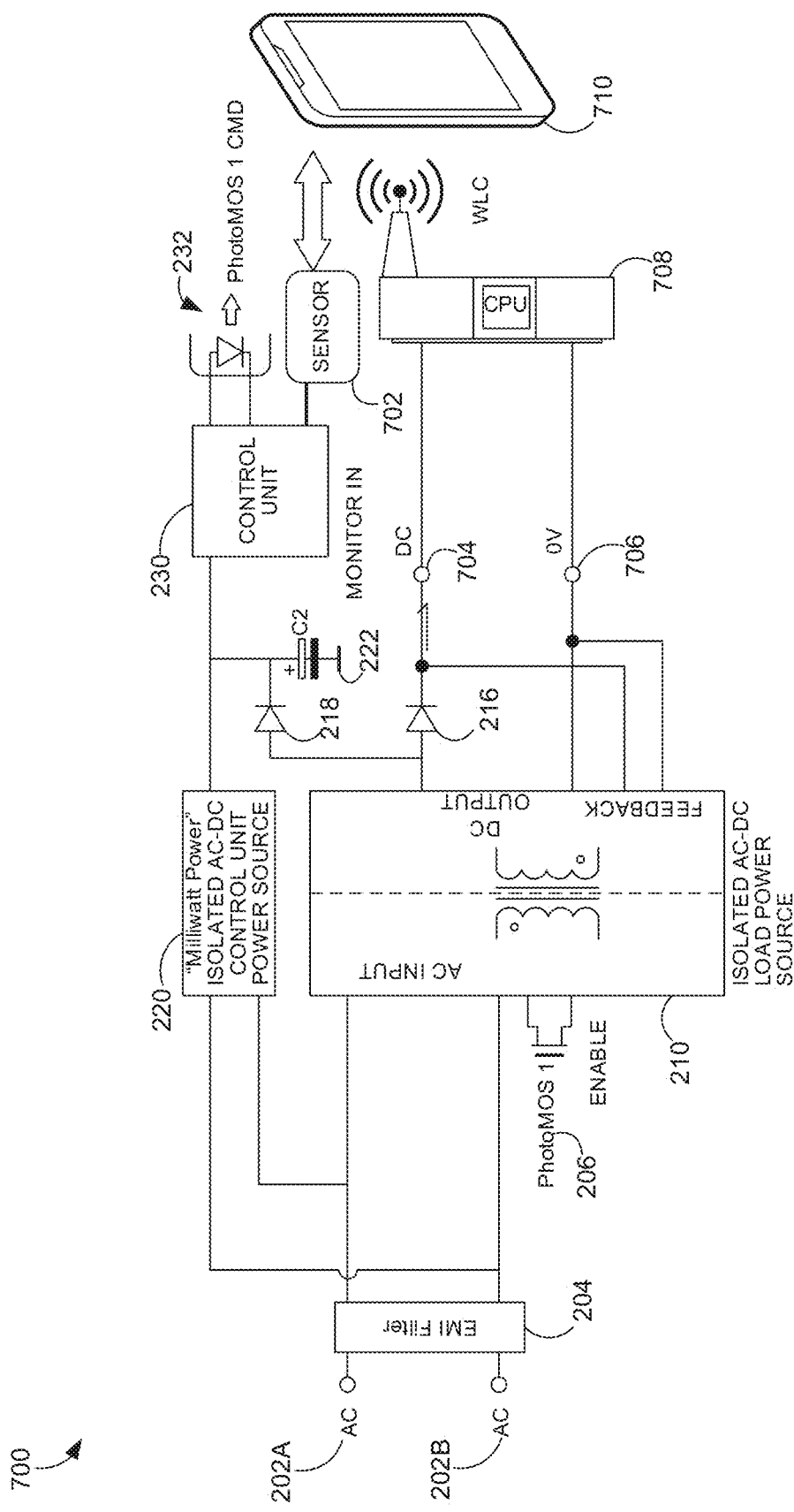
FIG. 7 illustrates example operational logic for a load power source, a control unit, and a control unit power source, in accordance with an embodiment of the present disclosure.

FIG. 7 depicts example operational environment 700, which comprises the AC power input terminals 202A and 202B, the EMI filter 204, semiconductor device 206, load power source 210, diodes 216 and 218, control unit power source 220, capacitor (C2) 222, control unit 230, and PhotoMOS 232. External sensor 702, connected to the control unit 230, may comprise an accelerometer, a magnetometer, a gyro sensor, an ambient light sensor, a proximity sensor, an infrared sensor, an ultraviolet sensor, an altimeter, a compass, a grip sensor, a near field communication device, another type of sensor, or one or more combinations thereof. The control unit 230 can determine whether the load is present based on load detection data received from external sensor 702.

The DC output terminal 704 and the terminal (0V) 706 can supply DC current output based on the system illustrated in example operating environment 700. For example, the control unit 230 can cause a discharge of electricity from the load power source 210 to a load. In some embodiments, central processing unit (CPU) 708 or computing device 710 can manage a wireless charging circuitry upon detection of the load, wherein the load is detected using external sensor 702. The discharge of electricity from the load power source 210 is based on the connection of the anode terminal of diode 216 with the load power source DC output, the connection of the cathode terminal of diode 216 with the DC output terminal 704, the feedback received by the load power source 210, instructions of the control unit 230, power supply conditions of the load power source 210, components and capabilities of the load power source 210, the AC power input associated with the AC power input terminals 202A and 202B, the EMI filter 204, other system features, or one or more combinations thereof.

The CPU 708 may have one or more arithmetic-logic units, a control unit, other components, or one or more combinations thereof. In some embodiments, the CPU 708 is a single-core CPU, a dual-core CPU, a quad-core CPU, an octa-core CPU, a deca-core CPU, another type of CPU, or one or more combinations thereof. In some embodiments, the CPU 708 can include a wireless circuitry for recharging computing device 710. The computing device 710 is a device that has the capability of receiving or transmitting a signal. A "computing device" may also be referred to as a "user device," "client device," "mobile device," "user equipment (UE)," "electronic device," or "wireless communication device." A computing device, in some aspects, may take on a variety of forms, such as a PC, a laptop computer, a desktop computer, a tablet, a mobile phone, a PDA, a server, an Internet of Things device, or any other device that is capable of communicating with other devices (e.g., by transmitting or receiving a signal using a wireless communication). A computing device may also be, in another embodiment, similar to computing device 900, described herein with respect to FIG. 9.

As noted above, the computing device 710 may include Internet of Things devices, such as one or more of the following: a sensor (e.g., a temperature sensor), controller (e.g., a lighting controller, a thermostat), an appliance (e.g., a smart refrigerator, a smart air conditioner, a smart alarm system), other Internet of Things devices, or one or more combinations thereof. Internet of Things devices may be stationary, mobile, or both. In some aspects, the computing device 710 is associated with a vehicle (e.g., a video system in a car capable of receiving media content stored by a media device in a house when coupled to the media device via a local area network). In some aspects, the computing device 710 comprises a medical device, a location monitor, a clock, a drone, a remote weather station, another wireless communication device, or one or more combinations thereof.

In some embodiments, CPU 708 and computing device 710 discussed herein may be configured to communicate using one or more of 4G (e.g., LTE), 5G, 6G, another communication system, or one or more combinations thereof. In embodiments, the network is the cloud or a cloud computing network (e.g., in communication with one or more Internet of Things devices). For example, the network may include various types of Internet of Things networks, such as a mesh network via Bluetooth low energy links or IPv6 over a low power wide-area network compatible with an Internet Engineering Task force specification.

Figure 8:
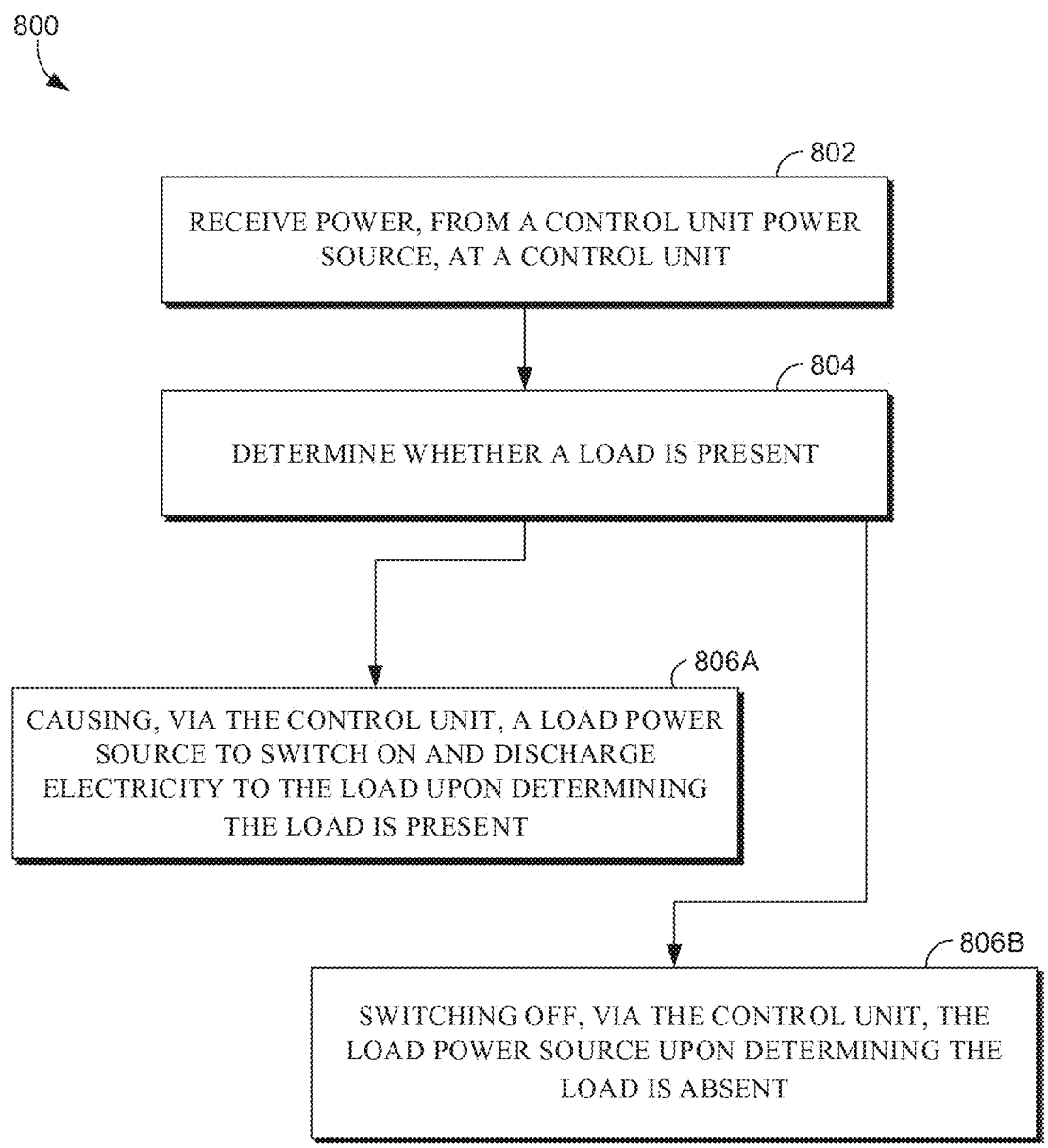
FIG. 8 depicts an example flow diagram suitable for implementing aspects of the technology described herein.

As illustrated in example flow diagram 800 of FIG. 8, a control unit receives power from a control unit power source at 802. In some embodiments, the control unit receives DC output generated by the control unit power source. For example, the control unit power source can generate the DC output based on receiving AC input from one or more AC terminals (e.g., power input terminals 202A and 202B of FIG. 2 having the EMI filter 204). In some embodiments, the control unit power source comprises a rechargeable battery. In other embodiments, the control unit power source comprises a first photovoltaic driver and a second photovoltaic driver mounted in an anti-parallel configuration. Continuing the example, the control unit power source also has a plurality of light emitting components and photodetectors encapsulated into the same photovoltaic driver package.

In some embodiments, the control unit receives power stored at a capacitor (e.g., capacitor (C2) 222 of FIG. 2 or capacitor 616 of FIG. 6), wherein the power stored at the capacitor was supplied from the control unit power source. In some embodiments, the control unit receives DC output generated by a load power source (e.g., load power source 210 of FIG. 2 or load power source 310 of FIG. 3) when the load power source is active.

The control unit determines whether a load is present at 804. The control unit can determine the presence or absence of the load without using a resistor, such as a shunt resistor for example. In embodiments, the control unit can determine whether the load is present based on load detection data. For example, the control unit can receive load detection data from a load detector, and external sensor, an input associated with connecting the load to the system associated with the control unit, an internal sensor of the control unit, another load detection data source, or one or more combinations thereof. In embodiments, the control unit can receive the load detection data based on transmitting a signal to the load detector. The signal transmitted to the load detector may include one or more reference voltages associated with one or more capacitors of the load detector. In some embodiments, the load detector is load detector 240 of FIGS. 2 and 6.

In some embodiments, the load detection data may include one or more measured voltages across one or more capacitors of the load detector. For example, the load detection data may comprise a voltage measured across a first capacitor and a voltage measured across a second capacitor at a predetermined time. As another example, the load detection data may include a voltage measured across the first capacitor at a first time and a voltage measured across the second capacitor at a later time. In addition, the load detection data may include sensor data from one or more sensors in communication with the control unit. For example, a magnetic sensor, a proximity sensor, or a photoelectric cell sensor may detect the presence of the load. As another example, the one or more sensors may receive power stored at a capacitor upon the capacitor receiving power from the control unit power source.

At 806A, the control unit causes the load power source to discharge electricity to the load upon determining the load is present. In some embodiments, the control unit causes the load power source to switch on upon determining the load is present. For example, the control unit can have at least one microprocessor and computer storage memory, wherein the computer storage memory has computer-executable instructions stored thereon that, when executed by the at least one microprocessor, cause the at least one microprocessor to activate the load power source, close a switch corresponding to the load detector, or one or more combinations thereof. In addition, the at least one microprocessor can also cause a high-frequency oscillator of the control unit to activate upon detection of the load.

At 806B, the control unit can switch off the load power source upon determining the load is absent. For example, at least one microprocessor can cause the load power source to deactivate (e.g., switching off the PhotoMOS 232 of FIG. 2). In addition, the at least one microprocessor can also cause a high-frequency oscillator of the control unit to deactivate upon detection of the absence of the load.

As such, the example flow diagram 800 provides various ways for reducing standby power consumption.

Example Computing Device

Having described the example embodiments discussed above of the presently disclosed technology, an example operating environment of an example computing device (e.g., computing device 710 of FIG. 7) is described below with respect to FIG. 9. Computing device 900 is but one example of a suitable computing environment, and is not intended to suggest any particular limitation as to the scope of use or functionality of the technology disclosed. Neither should computing device 900 be interpreted as having any dependency or requirement relating to any particular component illustrated, or a particular combination of the components illustrated in FIG. 9.

As illustrated in FIG. 9, example computing device 900 includes a bus 902 that directly or indirectly couples the following devices: memory 904, one or more processors 906, one or more presentation components 908, one or more input/output (I/O) ports 910, one or more I/O components 912, a power supply 914, and one or more radios 916.

Bus 902 represents what may be one or more busses (such as an address bus, data bus, or combination thereof). Although the various blocks of FIG. 9 are shown with lines for the sake of clarity, in reality, these blocks represent logical, not necessarily actual, components. For example, one may consider a presentation component, such as a display device, to be an I/O component. Also, processors have memory. Accordingly, FIG. 9 is merely illustrative of an exemplary computing device that can be used in connection with one or more embodiments of the technology disclosed herein.

Computing device 900 can include a variety of computer-readable media. Computer-readable media can be any available media that can be accessed by computing device 900 and may include both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information, such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 900. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. One or more combinations of any of the above should also be included within the scope of computer-readable media.

Memory 904 includes computer storage media in the form of volatile and/or nonvolatile memory. The memory 904 may be removable, non-removable, or a combination thereof. Example hardware devices of memory 904 may include solid-state memory, hard drives, optical-disc drives, other hardware, or one or more combinations thereof. As indicated above, the computer storage media of the memory 904 may include RAM, Dynamic RAM, ROM, EEPROM, flash memory or other memory technology, CD-ROM, a cache memory, DVDs or other optical disk storage, magnetic cassettes, magnetic tape, magnetic disk storage or other magnetic storage devices, a short-term memory unit, a long-term memory unit, any other medium which can be used to store the desired information and which can be accessed by computing device 900, or one or more combinations thereof.

The one or more processors 906 of computing device 900 can read data from various entities, such as the memory 904 or the I/O component(s) 912. The one or more processors 906 may include, for example, one or more microprocessors, one or more CPUs, a digital signal processor, one or more cores, a host processor, a controller, a chip, a microchip, one or more circuits, a logic unit, an integrated circuit (IC), an application-specific IC (ASIC), any other suitable multi-purpose or specific processor or controller, or one or more combinations thereof. In addition, the one or more processors 906 can execute instructions, for example, of an operating system of the computing device 900 or of one or more suitable applications.

The one or more presentation components 908 can present data indications via computing device 900, another computing device, or a combination thereof. Example presentation components 908 may include a display device, speaker, printing component, vibrating component, another type of presentation component, or one or more combinations thereof. In some embodiments, the one or more presentation components 908 may comprise one or more applications or services on a computing device, across a plurality of computing devices, or in the cloud. The one or more presentation components 908 can generate user interface features, such as graphics, buttons, sliders, menus, lists, prompts, charts, audio prompts, alerts, vibrations, pop-ups, notification-bar or status-bar items, in-app notifications, other user interface features, or one or more combinations thereof. For example, the one or more presentation components 908 can present a visualization that compares a plurality of inspections of one or more cores of a central processing unit and a visualization of each task of each of the plurality of inspections.

The one or more I/O ports 910 allow computing device 900 to be logically coupled to other devices, including the one or more I/O components 912, some of which may be built in. Example I/O components 912 can include a microphone, joystick, game pad, satellite dish, scanner, printer, wireless device, and the like. The one or more I/O components 912 may, for example, provide a natural user interface (NUI) that processes air gestures, voice, or other physiological inputs generated by a user. In some instances, the inputs the user generates may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with the one or more presentation components 908 on the computing device 900. In some embodiments, the computing device 900 may be equipped with one or more imaging devices, such as one or more depth cameras, one or more stereoscopic cameras, one or more infrared cameras, one or more RGB cameras, another type of imaging device, or one or more combinations thereof, (e.g., for gesture detection and recognition). Additionally, the computing device 900 may, additionally or alternatively, be equipped with accelerometers or gyroscopes that enable detection of motion. In some embodiments, the output of the accelerometers or gyroscopes may be provided to the one or more presentation components 908 of the computing device 900 to render immersive augmented reality or virtual reality.

The power supply 914 of computing device 900 may be implemented as one or more batteries or another power source for providing power to components of the computing device 900. In embodiments, the power supply 914 can include an external power supply, such as an AC adapter or a powered docking cradle that supplements or recharges the one or more batteries. In aspects, the external power supply can override one or more batteries or another type of power source located within the computing device 900.

Some embodiments of computing device 900 may include one or more radios 916 (or similar wireless communication components). The one or more radios 916 can transmit, receive, or both transmit and receive signals for wireless communications. In embodiments, the computing device 900 may be a wireless terminal adapted to receive communications and media over various wireless networks. Computing device 900 may communicate using the one or more radios 916 via one or more wireless protocols, such as code division multiple access ("CDMA"), global system for mobiles ("GSM"), time division multiple access ("TDMA"), another type of wireless protocol, or one or more combinations thereof. In embodiments, the wireless communications may include one or more short-range connections (e.g., a Wi-Fi® connection, a Bluetooth connection, a near-field communication connection), a long-range connection (e.g., CDMA, GPRS, GSM, TDMA, 802.16 protocols), or one or more combinations thereof. In some embodiments, the one or more radios 916 may facilitate communication via radio frequency signals, frames, blocks, transmission streams, packets, messages, data items, data, another type of wireless communication, or one or more combinations thereof. The one or more radios 916 may be capable of transmitting, receiving, or both transmitting and receiving wireless communications via mmWaves, FD-MIMO, massive MIMO, 3G, 4G, 5G, 6G, another type of Generation, 802.11 protocols and techniques, another type of wireless communication, or one or more combinations thereof.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software. For instance, various functions may be carried out by a processor executing instructions stored in memory. As such, other arrangements and elements (for example, machines, interfaces, functions, orders, and groupings of functions, and the like) can be used in addition to, or instead of, those shown.

Embodiments of the present disclosure have been described with the intent to be illustrative rather than restrictive. Embodiments described in the paragraphs above may be combined with one or more of the specifically described alternatives. In particular, an embodiment that is claimed may contain a reference, in the alternative, to more than one other embodiment. The embodiment that is claimed may specify a further limitation of the subject matter claimed. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A control unit for a load power source, the control unit powered by a control unit power source, the control unit comprising:
   one or more processors;
   one or more computer storage memory having computer-executable instructions stored thereon that, when executed by the one or more processors, cause the one or more processors to:
   switch on the load power source and cause a discharge of electricity from the load power source to a load upon detection, by using a load detector, of the load; and
   switch off the load power source upon detection, by using the load detector, of an absence of the load;
   wherein the control unit power source comprises:
   one or more photovoltaic drivers each comprising a light emitting component for receiving a current input and a photodetector associated with generating a current output; and
   one or more rectifier components connected to the one or more photovoltaic drivers for receiving the current output to generate power for the control unit,
   wherein the one or more photovoltaic drivers include a first photovoltaic driver and a second photovoltaic driver mounted in an anti-parallel configuration.

2. The control unit of claim 1, wherein the one or more photovoltaic drivers of the control unit power source receive the current input from a plurality of resistors and a capacitor to limit an alternating current.

3. The control unit of claim 2, wherein a transient-voltage-suppression (TVS) diode protects the one or more photovoltaic drivers.

4. The control unit of claim 1, wherein the current output of the one or more photovoltaic drivers is galvanically isolated from an input of the control unit power source.

5. The control unit of claim 1, wherein detection of the load and detection of the absence of the load includes causing a switch to disconnect a first capacitor from a second capacitor.

6. The control unit of claim 5, wherein detection of the load and detection of the absence of the load are based on a measured voltage across the first capacitor and a measured voltage across the second capacitor.

7. The control unit of claim 1, wherein the control unit further comprises a low-frequency oscillator and a high-frequency oscillator, and wherein the computer-executable instructions further cause the one or more processors to activate the high-frequency oscillator upon detection of the load.

8. The control unit of claim 7, wherein the computer-executable instructions further cause the one or more processors to deactivate the high-frequency oscillator upon detection of the absence of the load.

9. The control unit of claim 1, wherein the first photovoltaic driver and the second photovoltaic driver each comprise at least two light emitting components for receiving the current input, and wherein the one or more rectifier components include a first rectifier component and a second rectifier component, wherein the first rectifier component receives the current output from the first photovoltaic driver and the second rectifier component receives the current output from the second photovoltaic driver.

10. A method for reducing standby power consumption, the method comprising:
receiving power, from a control unit power source, at a control unit;
receiving load detection data;
based on the load detection data, determining whether a load is present or absent without using a resistor;
causing, via the control unit, a load power source to switch on and discharge electricity to the load upon determining the load is present; and
causing, via the control unit, the load power source to switch off upon determining the load is absent,
wherein the control unit power source comprises one or more photovoltaic drivers including a first photovoltaic driver and a second photovoltaic driver mounted in an anti-parallel configuration to generate power for the control unit.

11. The method of claim 10, wherein the control unit power source comprises one or more rectifier components connected to the one or more photovoltaic drivers.

12. The method of claim 11, wherein one or more rectifier components connected to the one or more photovoltaic drivers includes a first rectifier component and a second rectifier component each connected to at least one of the first photovoltaic driver and the second photovoltaic driver to generate power for the control unit.

13. The method of claim 12, wherein the load detection data includes magnetic data detected by a magnetic sensor of the control unit.

14. The method of claim 12, wherein the load detection data includes pressure data detected by a pressure sensor corresponding to an input for the load.

15. A system comprising:
a load power source;
a switch;
a load detector; and
a control unit having at least one microprocessor and computer storage memory, wherein the computer storage memory has computer-executable instructions stored thereon that, when executed by the at least one microprocessor, cause the at least one microprocessor to:
control the switch; and
switch off the load power source upon detection, by using the load detector, of an absence of a load; and
a control unit power source powering the control unit, the control unit power source comprising:
at least one photovoltaic driver including at least two photovoltaic drivers mounted in an antiparallel configuration; and
at least one rectifier component that receives current output from the at least one photovoltaic driver.

16. The method of claim 10, wherein determining the presence or absence of the load is based on a measured voltage across a capacitor.

17. The system of claim 15, wherein the load detector includes an external sensor connected to the control unit, the external sensor including one or more of an accelerometer, a magnetometer, a gyro sensor, an ambient light sensor, a proximity sensor, an infrared sensor, an ultraviolet sensor, an altimeter, a compass, a grip sensor, a near field communication device, or one or more combinations thereof.

18. The system of claim 17, wherein the at least one microprocessor causes the load power source to switch on via the switch upon detection of the load.

19. The system of claim 17, further comprising a control unit power source powering the control unit, the control unit power source comprising a battery.

20. The method of claim 12, wherein determining whether the load is present or absent is based on the load detection data being above or below a threshold for a predetermined time.

* * * * *

UNITED STATES PATENT AND TRADEMARK OFFICE
CERTIFICATE OF CORRECTION

PATENT NO. : 12,308,693 B2
APPLICATION NO. : 18/157481
DATED : May 20, 2025
INVENTOR(S) : Sandro Codato, Paolo Mazzocato and Franco Favaro It is certified that error appears in the above-identified patent and that said Letters Patent is hereby corrected as shown below:

In the Claims

Under Column no. 20, Claim 18, Line no. 42, please replace "claim 17, wherein" with --claim 15, wherein--.

Under Column no. 20, Claim 19, Line no. 45, please replace "claim 17, further" with --claim 15, further--.

Signed and Sealed this
Twenty-ninth Day of July, 2025

Coke Morgan Stewart
*Acting Director of the United States Patent and Trademark Office*